(No Model.) 3 Sheets—Sheet 3.
H. A. GROUX.
LAWN MOWER.
No. 336,639. Patented Feb. 23, 1886.
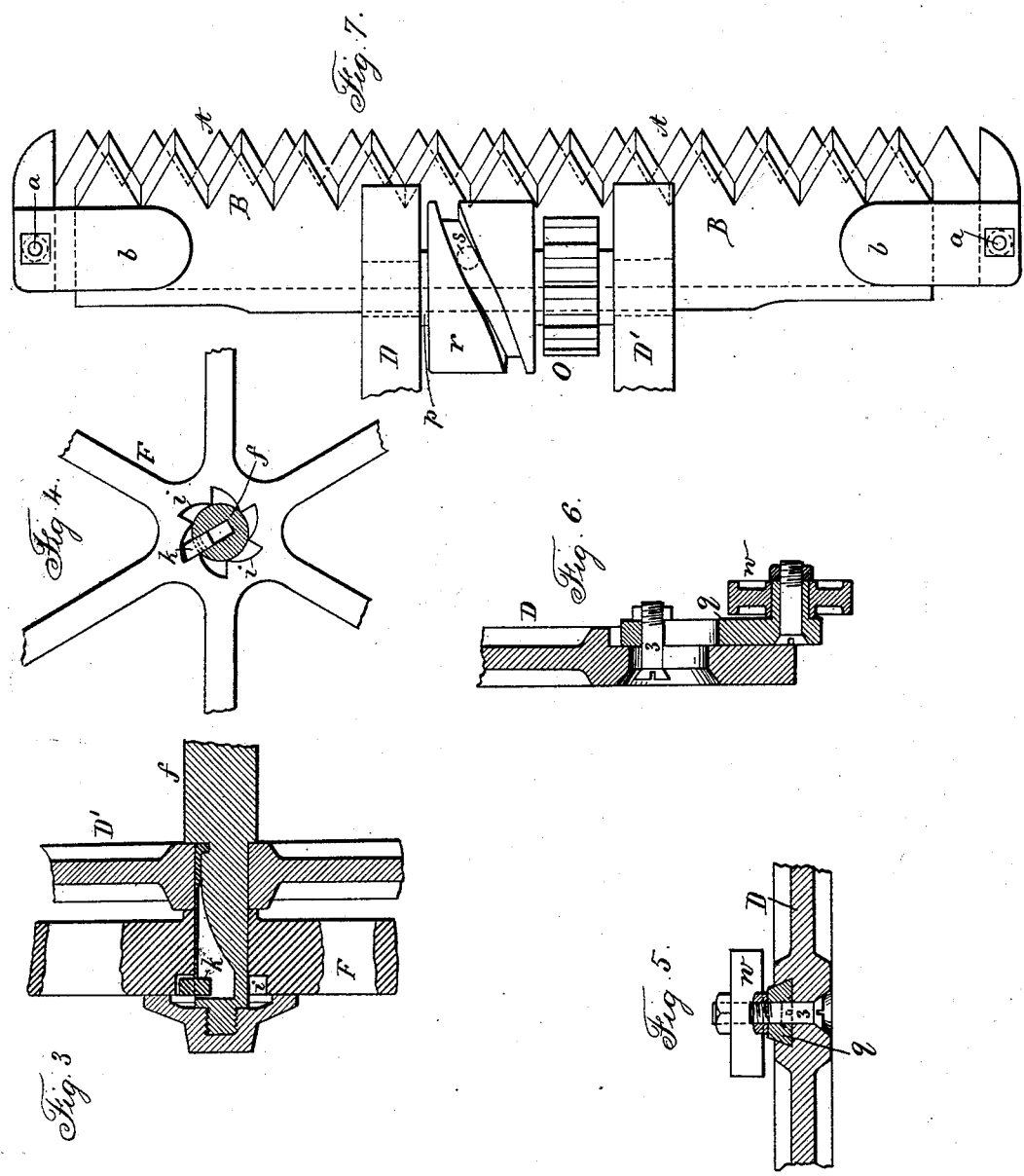
Witnesses:
J. Staib
Chas. H. Smith
Inventor
Henry A. Groux
per Lemuel W. Serrell
atty

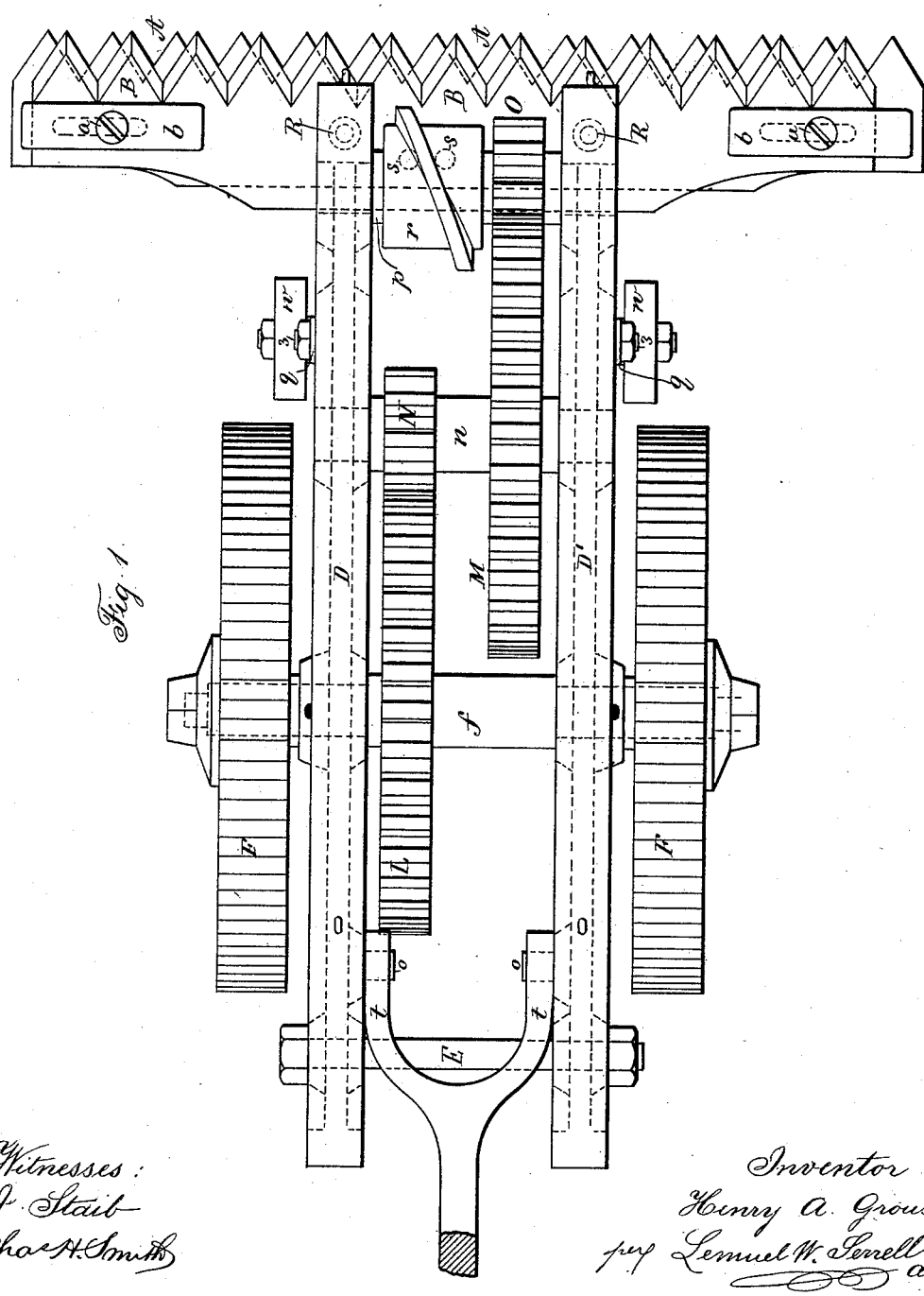

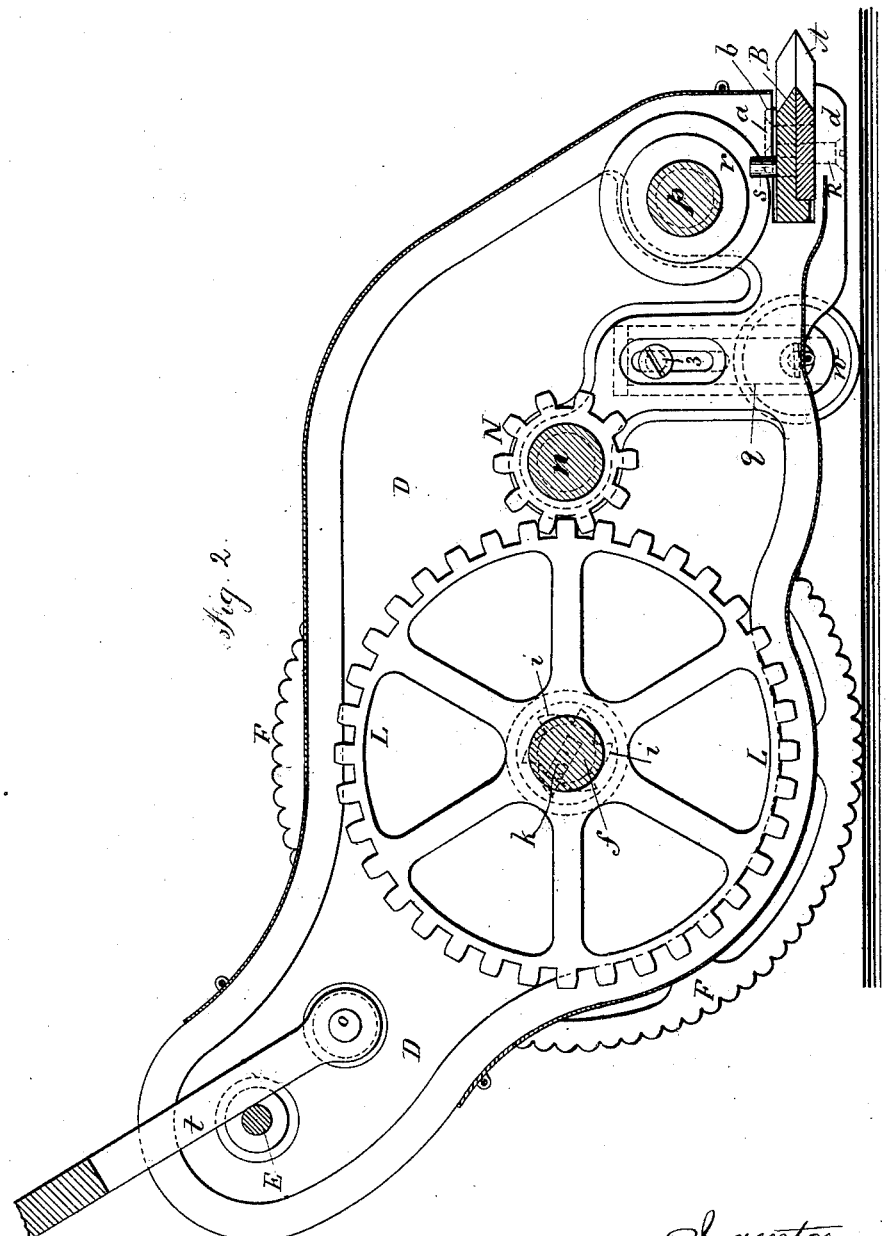

UNITED STATES PATENT OFFICE.

HENRY A. GROUX, OF MONTCLAIR, NEW JERSEY.

LAWN-MOWER.

SPECIFICATION forming part of Letters Patent No. 336,639, dated February 23, 1886.

Application filed December 22, 1884. Serial No. 150,905. (No model.)

*To all whom it may concern:*

Be it known that I, HENRY A. GROUX, of Montclair, in the county of Essex and State of New Jersey, have invented an Improvement in Lawn-Mowers, of which the following is a specification.

My mower is adapted to lawns and borders. I make use of a standing serrated cutter and a reciprocating cutter-bar similar to those before employed in mowing-machines and hand-mowers; but I connect the cutter to two frames that are near each other and carry the cross-shafts, driving-wheels, gearing, and a revolving spiral cam that acts directly upon the cutter-bar, and I provide adjustable supporting-rollers for varying the height of the cutter-bars. By this construction I am able to place the driving-wheels and supporting-rollers sufficiently near to each other to run upon narrow borders. The machine is light and cheap, and I am enabled to incase the gearing so as to prevent grass and other material lodging in the gearing, and the parts are easily kept clean and in repair.

In the drawings, Figure 1 is a plan view of the machine. Fig. 2 is a section transversely of the shafts and cutter-bars. Figs. 3 and 4 are sections at the hub of one of the driving-wheels. Figs. 5 and 6 are sections through the stock of one of the supporting-wheels; and Fig. 7 represents a modification of the cam.

The cutter A is of steel with serrated edge, and the cutter-bar B is similarly made, the bevel of the cutting-edges being upward on A and downward on B, so that the cutting-edges come together like shears. These cutters are kept in contact by the screws $a$ and spring-pressers $b$. These screws $a$ may pass through slots in the cutter-bar B, as seen in Fig. 1; or they may be at the ends of the cutter A, and the spring-pressers $b$ extend over the ends of the cutter-bar B, as seen in Fig. 7.

The frames D D' are provided with a bolt, E, to connect them and hold them at the proper distances apart, and there are foot-pieces $d$ that project at the front ends, and upon which the cutter A rests and is secured by screws R, passing up into the cutter.

The wheels F are upon the ends of the shaft $f$, that passes across through the frames D D'. Each wheel is held upon the shaft or axle $f$ by a nut or other suitable device, and the wheel is loose upon the shaft and provided with internal ratchet-teeth at $i$, and the shaft $f$ is recessed or mortised to receive the spring-pawl $k$. Each end of the shaft being thus fitted, the wheels will rotate the shaft $f$ when the mower is being pushed forward, but either wheel can turn backwardly or slower than the shaft, the spring-pawl yielding in so doing.

Upon the shaft $f$, between the frames D D', there is a gear-wheel, L, gearing into a pinion, N, upon the intermediate cross-shaft, $n$, and the wheel M is connected with the pinion, and revolves the pinion $o$ upon the cam-shaft $p$. The cam $r$ is circular, and it has either a spiral rib, as in Fig. 1, or a zigzag groove, as in Fig. 7, and upon the cutter-bar there is a stud, $s$, entering the groove, or two studs—one at each side of the ribbed cam. In either case, the revolving cam gives a rapid reciprocating motion directly to the cutter-bar, and there is no unnecessary friction or loss of motion.

The handle of the mower is made with a fork, $t$, at the lower end, terminating in eyes that are placed over the studs $o$, upon the inner surfaces of the frames D D', and when not in use the handle rests against the cross-bolt E.

The supporting-rollers $w$ are upon gudgeons projecting from the stock-pieces $q$, and there are in the frames D D' vertical grooves or channels that receive these stocks $q$, and the parts are slotted for the reception of the bolts
3. By adjusting the stocks and clamping them to the frames the rollers $w$ are made to support the frame and cutter-bars, so that the grass is cut at any desired height.

I claim as my invention—

1. The combination, with the cutter-bars A B, of the frames having the foot-pieces at the forward ends and the screws by which the cutter A is secured, the circular revolving cam having spiral groove or rib, the stud or studs on the cutter-bar, and the wheels and gearing for giving motion to the parts, and the adjusting-rollers $w$, stocks $q$, and bolts, substantially as set forth.

2. In a lawn-mower, the frames D D', adjacent to each other, in combination with the driving-shaft passing through such frames, the driving-wheels outside the frames, the ratchets and spring-pawl connections to the shaft, the gear-wheels L M, pinions N O, and revolving cam between the frames, the cutter A, fastened to the frames D D', the cutter-bar resting upon the cutter and receiving motion from the cam, and the bolts and fingers for connecting the cutter-bar to the cutter, substantially as set forth.

Signed by me this 17th day of December, A. D. 1884.

HENRY A. GROUX.

Witnesses:
GEO. T. PINCKNEY,
WILLIAM G. MOTT.